Patented Apr. 29, 1941

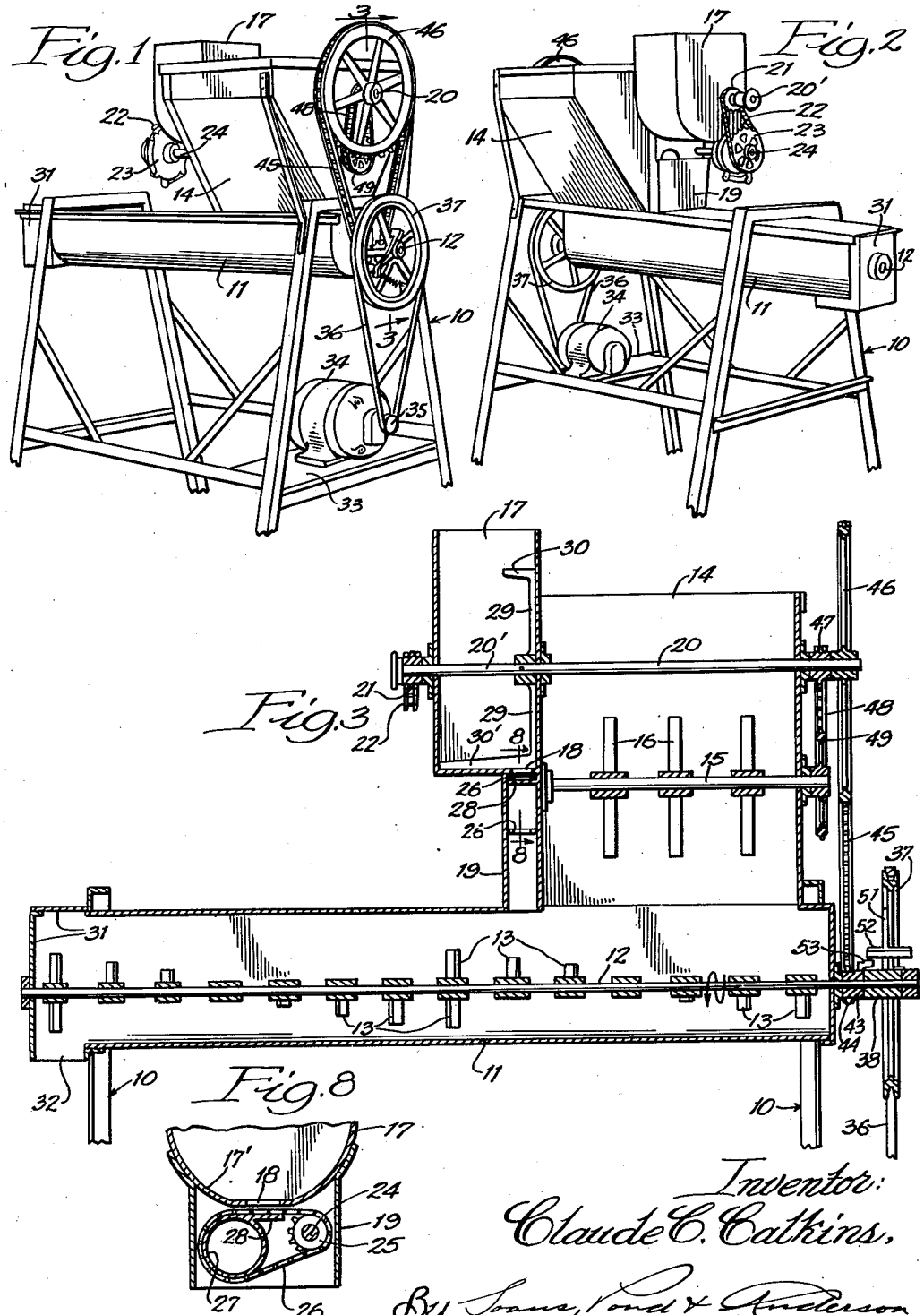

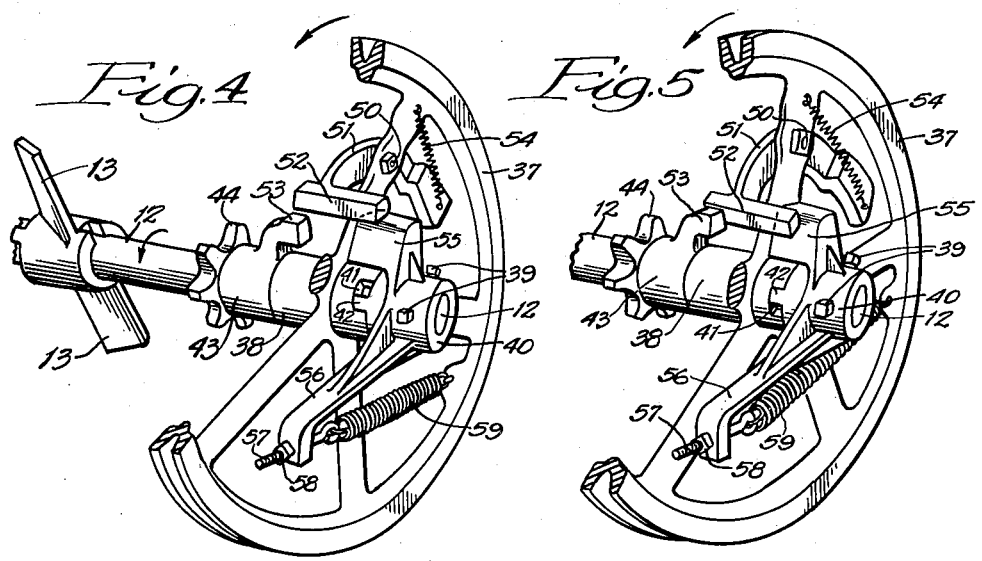
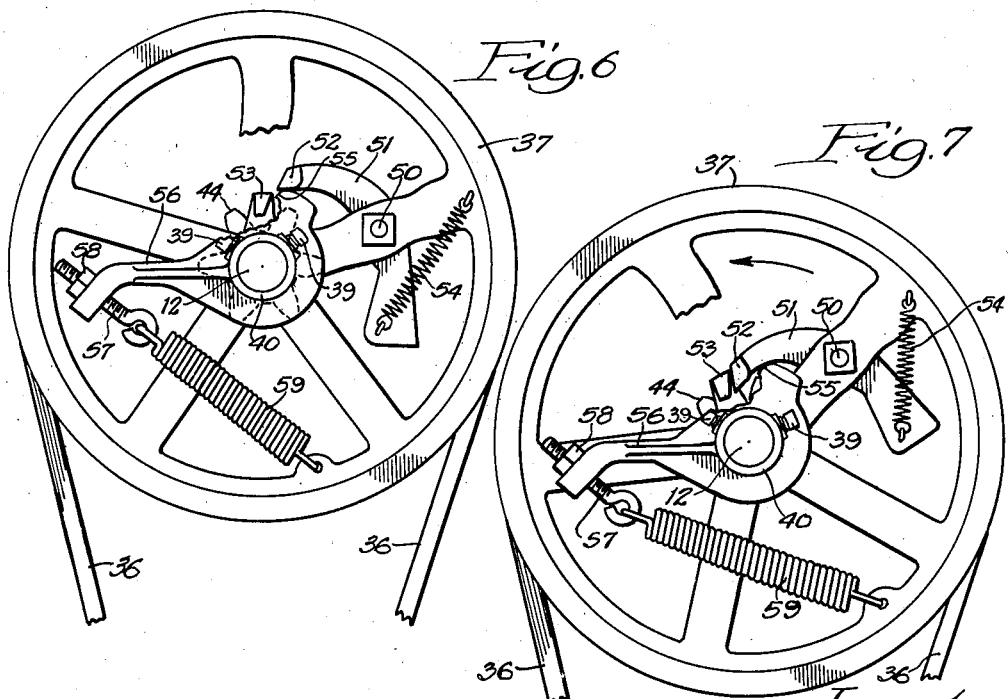

2,239,777

UNITED STATES PATENT OFFICE 2,239,777

AUTOMATIC POWDER FEED REGULATOR

Claude C. Calkins, Spokane, Wash.

Application October 31, 1940, Serial No. 363,657

6 Claims. (Cl. 221—96)

A powder going under the trade-name of "Ceresan," and consisting principally of mercury dust or copper carbonate, is distributed by these machines onto a traveling body of grain, cotton seed, or other seed to prevent the development of smut or fungus growths which injure the seed. This powder is quite expensive, and hence it is desirable on the ground of economy to prevent a wasteful use of such powder. Manifestly, if the powder continues to feed when the grain chamber is empty, a waste of powder occurs.

In these machines the grain and powder are fed simultaneously, usually from a single source of power; and heretofore, so far as I am aware, it has been necessary for the operator of the machine to closely watch the grain feed, and when the grain feed chamber runs empty to disconnect and shut off the powder feed. The operator sometimes fails to observe when the grain feed chamber is empty and consequently fails to shut off the powder feed, so that more or less of the expensive powder is wasted.

The object of this invention has been to provide an automatically operating device by which, when the normal body of grain is moving through the grain chamber the powder feed will be maintained, but when the body of grain in the grain chamber is exhausted, or substantially so, the drive to the powder feed will be automatically disconnected, and when the grain in the grain chamber has been replenished to normal condition, the drive of the powder feed will be automatically restored, said device preferably taking the form of a separable connection between an element of the drive of the grain feeding shaft and an element of the drive of the powder feed device. In accordance with the present invention, this automatic control of the powder feed depends for its operation on the load imposed on the grain feed shaft; the driving connection to the powder feed being maintained so long as the load on the shaft is normal, but being automatically disconnected when the load on the grain feed shaft falls to or near the zero point, and being automatically restored as soon as the normal load on the shaft has been restored.

A machine illustrating one practical embodiment of the invention is shown in the accompanying drawings, in which—

Fig. 1 is a perspective elevation of the complete machine, including the supporting frame, the grain feed chamber, the superposed grain hopper and powder hopper, a motor, and power transmitting mechanism from the motor to the grain feed shaft and thence to the powder feed shaft.

Fig. 2 is a perspective elevation of the same machine, viewed from the other side.

Fig. 3 is a vertical axial longitudinal section through the grain feed chamber, its superposed hopper and the powder feed chamber.

Figs. 4 and 5 are perspective details, partly broken away, showing the mechanism by which the drive from the grain feed shaft to the powder feed shaft is automatically maintained operative during a normal feed of grain, but is automatically rendered inoperative when the grain feed chamber is substantially empty; Fig. 5 showing the operative condition of the parts and Fig. 4 showing the inoperative position.

Figs. 6 and 7 are end elevations, viewed from the right, of the parts shown in Figs. 4 and 5 respectively.

Fig. 8 is a fragmentary vertical section illustrating a preferred form of powder feed mechanism.

Referring first to Figs. 1, 2, 3 and 8, 10 designates as an entirety an upright supporting frame carrying the operating parts of the machine. Mounted on the upper portion of this frame and disposed lengthwise thereof is a grain feed chamber or compartment 11, in the opposite end walls of which is journaled a feed shaft 12 equipped with a series of obliquely disposed paddles 13 (see Figure 4) by which, under rotation of the shaft 12 in a direction indicated by arrows in Figs. 3 and 4, the grain is advanced through the chamber 11.

Mounted on the receiving end of the chamber 11 is the grain hopper 14 into the upper end of which grain destined for powder treatment is dumped. Extending across the hopper 14 is a shaft 15 equipped with radial arms 16 by which the grain is stirred or agitated and prevented from bridging in the hopper 14.

Mounted on one end of the hopper 14 is the powder hopper 17 that, as best shown in Fig. 8, is formed with a rounded substantially semi-circular bottom 17' slightly flattened at its lower end, and in this flattened lower end is an opening 18 through which the powder is discharged. Attached to the bottom of the hopper 17 on the inner side thereof is a depending chute 19 having an open lower end overlying and communicating with the seed chamber 11, as shown in Fig. 3.

Journaled in and between the end walls of the grain hopper 14 is a shaft 20, one end portion 20' of which also extends through the powder hopper 17. Keyed on the projecting end of the shaft extension 20' is a sprocket 21 which, through a sprocket chain 22 (Fig. 2), drives a sprocket 23 fast on the outer end of a short shaft 24 that extends through and has a bearing in the outer side wall of the chute 19. Keyed on the inner end of shaft 24 is a sprocket 25, over which passes an endless sprocket chain 26 (Fig. 8), the opposite end of the chain being supported and guided over a circular bridge piece 27 mounted between the side walls of the chute, the top lap of the sprocket chain 26 being supported by a plate 28 continuous with the upper end of the bridge 27.

The powder in the hopper 17 falls through the hole 18 directly onto the chain 26; and keyed on the drive shaft 20' within the hopper 17 is a reel or spider formed with radial arms 29, preferably four in number, and paddles 30 that agitate the powder, prevent its packing, and cause it to flow in a substantially continuous stream through the hole 18 onto the sprocket chain, from which latter the powder falls in a practically uniform stream onto the stream of grain traveling through the grain chamber 11. Only one of the paddles, such as 30' (Fig. 3) needs to be of sufficient length to extend across the full width of the hopper. The other paddles need only be of sufficient length to wipe across the outlet 18.

The above described powder hopper and feed is substantially identical, except as to the means for driving feed chain 26, with that disclosed and claimed in my former Patent No. 2,080,694, granted May 18, 1937.

Attached to the discharge end of the grain compartment 11 is a cover 31 in the outer vertical wall of which one end of the feed shaft 12 is journaled; and in the lower side of this cover is an opening 32 through which the treated grain falls into an underlying bag or other container (not shown).

Coming now to a description of the driving mechanism, in which the present invention mainly resides, and referring more particularly to Figs. 4, 5, 6 and 7, mounted on a base plate 33 (Figs. 1 and 2) of the frame 10 is an electric motor 34, on the armature shaft of which is a small groove pulley 35 driving a belt 36 that passes over a relatively large pulley 37, the hub 38 of which is loose on the grain feed shaft 12. Secured on the end of the shaft 12, as by set screws 39 is a sleeve 40 of substantially the same diameter as the pulley hub 38 and at its inner end in contact with the outer end of pulley hub 38. In the outer end of hub 38 is an arcuate notch 41, and on the inner end of sleeve 40 is a lug 42 of less width than the notch 41, so that the lug may have a limited play through the notch between the two positions illustrated in Figs. 4 and 5. When the machine is operating with a normal load of grain in the grain feed compartment 11, the rotation of pulley 27 by its belt 36 in the direction indicated by the arrows rotates the shaft 12 through engagement of one end wall of the notch 41 with the lug 42 on the sleeve 40 which is keyed to shaft 12, as shown in Fig. 5.

In this loaded condition of the machine, the powder feed device is also driven through the following mechanism. Loose on the shaft 12 just inwardly of the pulley hub 38 is the hub 43 of a small sprocket wheel 44. This sprocket wheel 44 through a sprocket chain 45 (Fig. 1) drives a relatively large sprocket wheel 46 that is keyed on the outer end of the shaft 20, 20', of the powder feed mechanism. A drive from shaft 20 to the agitator shaft 15 consists of a small sprocket 47 fast on shaft 20, a sprocket chain 48, and a relatively large sprocket 49 fast on shaft 15.

When the machine is normally loaded, the sprocket 44 is driven from the pulley 37 by the following means. Pivoted at 50 on one spoke of the pulley 37 is a curved lever 51, continuous with the forward end of which is a transversely extending bar 52. Integral with the hub 43 of the sprocket 44 is a raised lug 53 that extends across the path of travel of the bar 52 when the latter is in its lowered position shown in Figs. 5 and 7, and, by its push on the lug 53 drives the powder feed. Connected to the tail end of lever 51 and anchored to one of the spokes of the pulley 37 is a light pull spring 54 that normally maintains the engagement of bar 52 with lug 53 as shown in Figs. 5 and 7.

Integral with the sleeve 40 is a radially disposed cam 55, that, in the normal operation of the machine, lies behind the outer end of the bar 52, as shown in Figs. 5 and 7. Also integral with the sleeve 40 is a substantially radial arm 56, in the free end of which is a tapped hole that receives an eye-screw 57 that is secured in adjusted position by a lock nut 58. Connected between the eye of the screw 57 and the rim of the pulley 37 is a pull spring 59, the tension of which may be adjusted by backing off or advancing the lock nut 58.

An understanding of the mode of operation will be facilitated by the statement that when there is a normal load of material being treated in the trough 11 opposing the rotation of the feed shaft 12, the tension of the spring 59 is insufficient to rotate the shaft; but when the trough is empty, or approximately empty, and there is practically no load on the shaft 12, the tension of spring 59 is then sufficient to turn the shaft to the extent of shifting the lug 42 out of engagement with the trailing end of its cooperating notch 41 (Fig. 5) into engagement with the advance end of said notch (Fig. 4). The normal driving position of the parts when feeding both grain and powder is that shown in Figs. 5 and 7, the grain feed shaft 12 being driven from the pulley 37 by contact of the trailing end of notch 41 with lug 42 through collar 40 which is keyed on the shaft 12, and the powder is fed onto the grain by the pushing contact of bar 52 with lug 53. When the load on the shaft 12 ceases, or becomes light, then spring 59 shifts sleeve 40 to the position shown in Fig. 4 wherein lug 42 strikes the advance end of notch 41. During this movement the cam 55 shifts push bar 52 out of driving engagement with lug 53, thus arresting the powder feed. As soon as the next load is imposed on shaft 12, the rotation of sleeve 40 is slowed down, and pulley 37 overruns sleeve 40, which carries bar 52 off cam 55 and allows it to drop back, under the pull of spring 54, into driving engagement with lug 53. At the same time it brings the trailing end of notch 41 back into driving contact with lug 42, and the feed of both grain and powder is then resumed. The overrunning movement of pulley 37 retensions spring 59.

It will thus be seen that so long as a normal volume of material to be treated is moving through the compartment 11 under the push of the paddle shaft 12, the drive to the powder feed mechanism is maintained and a proper amount of powder is fed onto the traveling material. But, as soon as the trough 11 becomes empty or substantially so, so as to relieve or lighten the load on the shaft 12, the drive to the powder feed is automatically disconnected, and is later re-established as soon as the next charge of material to be treated is introduced to the trough 11, thereby reimposing a load on the shaft 12. This, obviously, prevents the feeding of the powder when the compartment 11 is substantially empty, and thus avoids waste of the powder. So far as I am aware, the present invention is the first device in the art to automatically accomplish this desirable result; and hence, the invention is not limited to the specific mechanism herein illustrated and described, but may be modified in the details of structure and arrangement within the scope and coverage of the appended claims.

I claim:

1. In a machine of the class described, the combination, with a compartment for material to be treated, a feed shaft journaled in said compartment, and a superposed powder feed device discharging into said compartment, of mechanism for driving said feed shaft, mechanism for driving said powder feed device, driving and driven members carried respectively by said feed shaft driving mechanism and said powder feed driving mechanism normally engaged with each other when said feed shaft is under load, and spring-actuated means automatically acting to shift said driving and driven members out of engagement with each other when said feed shaft is not under load.

2. In a machine of the class described, the combination, with a compartment for material to be treated, a feed shaft journaled in said compartment, and a superposed powder feed device discharging into said compartment, of mechanism for driving said feed shaft, mechanism for driving said powder feed device, driving and driven members carried respectively by said feed shaft driving mechanism and said powder feed driving mechanism normally engaged with each other when said feed shaft is under load, spring-actuated means automatically acting to shift said driving and driven members out of engagement with each other when said feed shaft is not under load, and spring-actuated means automatically returning said driving and driven members into engagement with each other when said feed shaft is again under load.

3. In a machine of the class described, the combination with a trough for material to be treated, a feed shaft journaled in and lengthwise of said trough, and a superposed powder feed device discharging into said trough, of mechanism for driving said shaft including a pulley loose on said shaft, and a sleeve fast on said shaft, mechanism, including a sprocket loose on said shaft, for driving said powder feed device, a lug on said sprocket, a lever pivoted on said pulley carrying a bar adapted to drive said sprocket through contact with said lug, a spring urging said bar into lug driving position, a lost motion connection between the hub of said pulley and said sleeve, a cam on said sleeve behind said bar, and a pull spring between said pulley and sleeve operating, when there is no load on said shaft, to turn said sleeve and shaft and cause said cam to move said bar out of driving engagement with said lug.

4. An embodiment of the combination defined in claim 3, wherein the pulley hub and sleeve are disposed end to end on the shaft and the lost motion connection therebetween comprises a pin on the end of one engaged with an arcuate slot in the adjacent end of the other of greater length than the width of said pin.

5. An embodiment of the combination defined in claim 3, wherein the pull spring between the pulley and sleeve is provided with means for adjusting its tension.

6. An embodiment of the combination defined in claim 3, wherein the sleeve has a radial arm equipped with an adjustable bolt in its free end, and the pull spring between the pulley and sleeve is connected at one end to said bolt.

CLAUDE C. CALKINS.